(12) United States Patent
Matsumoto et al.

(10) Patent No.: US 8,442,333 B2
(45) Date of Patent: May 14, 2013

(54) PARALLEL PROCESSING IMAGE ENCODING DEVICE WITH VARIABLE LENGTH CODING

(75) Inventors: Keisuke Matsumoto, Tokyo (JP); Seiji Mochizuki, Tokyo (JP); Kenichi Iwata, Tokyo (JP); Fumitaka Izuhara, Tokyo (JP); Motoki Kimura, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 1043 days.

(21) Appl. No.: 12/401,613

(22) Filed: Mar. 10, 2009

(65) Prior Publication Data

US 2009/0245664 A1 Oct. 1, 2009

(30) Foreign Application Priority Data

Mar. 27, 2008 (JP) .................. 2008-082470

(51) Int. Cl.
*G06K 9/36* (2006.01)
*G06K 9/46* (2006.01)

(52) U.S. Cl.
USPC .......................... 382/234; 382/236

(58) Field of Classification Search .............. 382/166, 382/234, 236, 238, 248; 348/403.1, 415.1, 348/420.1; 375/240.12, 240.2, 240.24
See application file for complete search history.

(56) References Cited

U.S. PATENT DOCUMENTS

| | | | | |
|---|---|---|---|---|
| 4,591,909 A | * | 5/1986 | Kuroda et al. | 375/240.12 |
| 6,141,381 A | * | 10/2000 | Sugiyama | 375/240.16 |
| 7,512,278 B2 | * | 3/2009 | Magee et al. | 382/232 |
| 8,111,752 B2 | * | 2/2012 | Kumar et al. | 375/240.16 |
| 2002/0025000 A1 | | 2/2002 | Takeuchi et al. | |
| 2003/0133169 A1 | * | 7/2003 | Uchibayashi et al. | 358/426.07 |
| 2005/0249289 A1 | * | 11/2005 | Yagasaki et al. | 375/240.18 |
| 2007/0242892 A1 | * | 10/2007 | Sugimoto et al. | 382/238 |
| 2008/0031329 A1 | | 2/2008 | Iwata et al. | |
| 2008/0043845 A1 | * | 2/2008 | Nakaishi | 375/240.16 |

FOREIGN PATENT DOCUMENTS

| | | |
|---|---|---|
| JP | 2000-333180 A | 11/2000 |
| JP | 2002-27469 A | 1/2002 |
| JP | 2008-042571 A | 2/2008 |

OTHER PUBLICATIONS

"Test Model 5" MPEG.ORG [online] searched Mar. 24, 2008, URL: http://www.mpeg.org/MPEG/MSSG/tm5/.
Tomokazu Murakami, "Adaptive Macroblock Quantization Parameter Setting Method for H.264/AVC", PCSJ2004, Nov. 2004.
Office Action issued Jun. 5, 2012, in Chinese Patent Application No. 200910005428.4.
Office Action issued on Feb. 23, 2012 in Japanese Appln. No. 2008-082470.

* cited by examiner

*Primary Examiner* — Yubin Hung
(74) *Attorney, Agent, or Firm* — Miles & Stockbridge P.C.

(57) ABSTRACT

The present invention provides an image encoding device which does not necessitate reference of a quantization parameter between consecutive macroblocks across a parallel processing area boundary without forming slices. The image encoding device encodes a macroblock of an encoding target image by parallel processing sequentially from the top of a parallel processing area, and possesses an encoding element for every parallel processing area. When all the quantized orthogonally-transformed coefficients of a top macroblock of the parallel processing area are zero, the encoding element adds a non-zero coefficient to a part of the coefficients, making the coefficients non-zero. Accordingly, generation of a skip macroblock in the top macroblock of each parallel processing area is suppressed. Since slice formation is not necessary, the prediction over a parallel processing area boundary is applied, and encoding efficiency improves. Errors are not generated in decoding and the decoded image quality does not deteriorate.

8 Claims, 7 Drawing Sheets

PARALLEL PROCESSING IMAGE ENCODING DEVICE WITH VARIABLE LENGTH CODING

CROSS REFERENCES TO RELATED APPLICATIONS

The disclosure of Japanese Patent Application No. 2008-82470 filed on Mar. 27, 2008 including the specification, drawings and abstract is incorporated herein by reference in its entirety.

BACKGROUND OF THE INVENTION

The present invention relates to an image encoding device and to technology which is effective when applied to a moving image recording and reproducing device at large, for example, a digital camera which possesses hardware and software for moving image encoding/decoding, a digital video camera, a DVD (Digital Versatile Disc)/HDD (Hard Disc Drive) recorder, a mobile-phone, and the like.

In the system treating a moving image code, HD (High-Definition) has entered the proliferation period, and utilization of a larger screen such as 4k digital cinema, a super Hi-Vision, etc. is advancing on the research level. An image encoding device and an image decoding device handling these signals are required to possess a high processing capability. In order to improve a processing capability with a low power consumption (at a low operating frequency), the parallel encoding is proposed, which will become indispensable technology when processing a moving image in the future. The H.264 standard can provide a high compression up to $\frac{1}{100}$-$\frac{1}{200}$, maintaining a high-quality image. Therefore, the H.264 standard is employed as a coding standard of terrestrial digital broadcasting and the next generation DVD standard, and also planned to be adopted as a coding standard of the future 4k digital cinema or super Hi-Vision.

The following documents treat the moving image parallel encoding technology and the encoding technology with a quantization parameter changing in units of macroblock.

Patent Document 1 (Japanese patent laid-open No. 2008-42571) discloses technology in which a screen of a moving picture is divided into plural areas, and encoding is performed in parallel, in order to encode a large screen moving picture. Patent Document 2 (Japanese patent laid-open No. 2000-333180) discloses a method in which, based on the reason that a first and a last macroblock of each slice of an image processing area should not be a skip macroblock, the macroblock type of the skip macroblock concerned is changed. Non-patent Document 1 ("Test Model 5", MPEG.ORG, online, searched on Mar. 24, 2008, the Internet <URL:http://www.mpeg.org/MPEG/MSSG/tm5/>) discloses technology in which a quantization parameter is changed in units of macroblock in order to adjust the rate. Non-Document 2 (Tomokazu Murakami and Isao Karube; "A consideration on setting up a quantization parameter of the macroblock level in H.264/AVC", PCSJ2004, November 2004) discloses technology in which a quantization parameter is changed in units of macroblock depending on an image to attain a high-quality image.

SUMMARY OF THE INVENTION

The present inventors have studied the processing of parallel encoding of plural macroblocks, in conformity with a moving image compression encoding system decided as H.264. That is, the present inventors have studied a case where an encoding target image is divided into plural areas, and a parallel processing is performed sequentially from a top for every divided area. In particular, it is premised that a slice is not formed among parallel processing areas. In parallel encoding for this case, a last macroblock (a macroblock is simply described also as MB) and a top MB of each area which undergo the parallel processing will continue across a parallel processing area boundary. At this time, the top MB of an area is encoded earlier than the last MB of the continuing area due to the parallel processing. Therefore, the quantization parameter of MB which continues across the parallel processing area boundary must be determined independently. In this meaning, when performing the parallel processing, the optimal quantization parameter according to an encoding target image will be supplied to a quantizer etc.

With respect to a quantization parameter, in the moving image encoding, MB not possessing a non-zero coefficient at all in the quantized orthogonally-transformed coefficient, which has been orthogonally transformed and quantized, may be sometimes encoded to a skip macroblock in variable-length coding, and not only a quantized orthogonally-transformed coefficient but also a quantization parameter is not included in the variable-length coding information. According to H.264, decoding such a skip macroblock will use the quantization parameter of the previous MB. Therefore, also in the parallel encoding, when there is no non-zero coefficient in the top MB of a certain parallel processing area, it is necessary to use the quantization parameter of the last MB of the adjoining processing area which is the previous MB in a screen. However, as mentioned above, in the parallel encoding, the top MB of each area which undergoes the parallel processing is encoded earlier than the last MB of the continuing previous area, therefore, the quantization parameter of the last MB of the previous area which is processed later cannot be used for quantization etc. of the top MB which is processed earlier than the last MB. If this problem is neglected, it will produce a decoding error in decoding, and it will become a cause of deterioration of decoded image quality.

In the H.264 standard, a deblocking filter is provided as an in-loop filter to decrease distortion in the image between frames, and an intra-frame prediction is performed. Therefore, with respect to a quantization parameter supplied to a deblocking filter, similarly as described above, the quantization parameter of the last MB of the previous area which is processed later cannot be used for quantization etc. of the top MB which is processed earlier than the last MB. In spite of the fact that slices are not formed, if a quantization parameter differs between the top MB of a certain parallel processing area and the last MB of an adjoining previous area, the top MB of the area will undergo deblocking filtering using an improper quantization parameter, and an improper encoding will be performed as the result.

A first simple method of avoiding the above described problem is to form a slice for every parallel processing area. This is because that reference of the quantization parameter across slices does not occur according to the standard. However, since prediction is not applied between slices, there is a problem that encoding efficiency deteriorates. A second simple method is to fix the quantization parameter in a picture. However, this method leads to the fact that a rate does not match and that control of the quantization parameter depending on an image is difficult; therefore, degradation of image quality is inevitable.

Any one of documents described above does not give a method of solving the problem, and primarily, does not pay attention to the problem in the H.264 standard.

The present invention has been made in view of the above circumstances and provides an image encoding device which does not necessitate reference of a quantization parameter between consecutive macroblocks across a parallel processing area boundary without forming slices.

The other purposes and the new feature of the present invention will become clear from the description of the present specification and the accompanying drawings.

The following explains simply an outline of typical one of the inventions disclosed by the present application.

(1) Reference of a quantization parameter crossing an area is avoided from occurring, by adding compulsorily a non-zero coefficient to a part of quantized orthogonally-transformed coefficients in a top macroblock of the area.

(2) In the case of the top macroblock of an area, even if all quantized orthogonally-transformed coefficients are zero, the value of a coded block pattern (coded_block_pattern), which is a flag indicating the existence or nonexistence of a non-zero coefficient included in variable-length coding information, is changed so as to indicate that the non-zero coefficient exists, and "mb_qp_delta" (a difference of the quantization parameter between adjoining macroblocks included in an encoding stream) is added. Accordingly, the reference of the quantization parameter crossing an area is avoided from occurring.

(3) Holding the quantization parameter used when encoding the top macroblock of an area, the reference of the quantization parameter crossing the area is enabled by encoding the last macroblock of an adjoining area with the use of the held quantization parameter. At this time, when all the quantized orthogonally-transformed coefficients of the last macroblock of an adjoining area are zero, the means of (1) or (2) described above is employed with respect to the macroblock concerned.

In either means of (1) and (2) described above, it is not necessary to provide slices; therefore, the prediction can be applied across a parallel processing area boundary, and encoding efficiency improves. An error is not generated in decoding and deterioration of decoded image quality is not induced. Since the quantization parameter in a picture can be unfixed, it is possible to realize a high-quality image by rate control and control of the quantization parameter depending on an image.

The following explains briefly the effect acquired by the typical one of the inventions disclosed by the present application.

That is, without forming slices, reference of a quantization parameter can be made unnecessary between consecutive macroblocks across a parallel processing area boundary, accordingly a high-quality image of a decoded image becomes realizable.

DETAILED DESCRIPTION OF THE PREFERRED EMBODIMENTS

Figure 1:
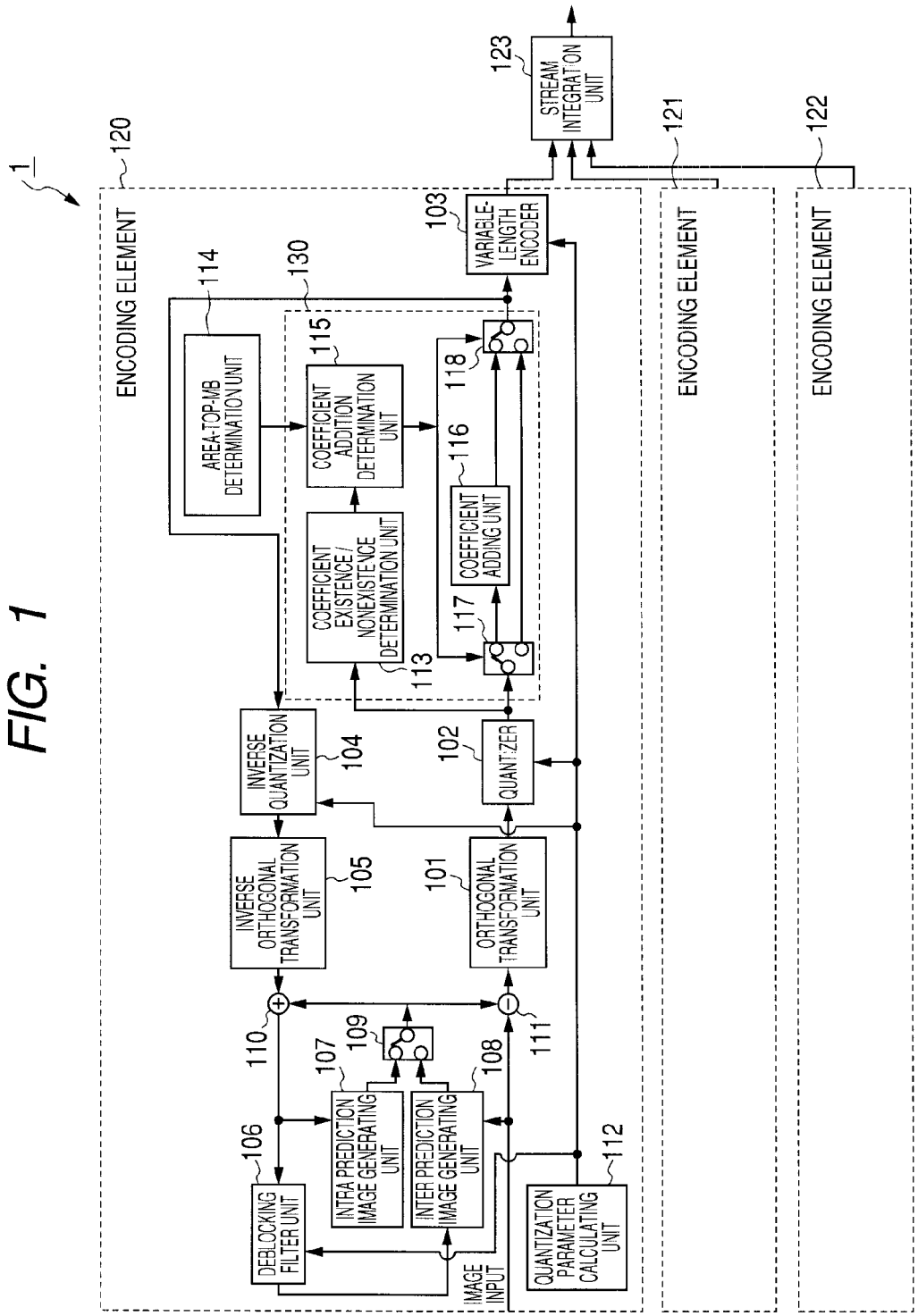
FIG. 1 is a block diagram illustrating configuration of a first image encoding device according to the present invention.

Hereinafter, with reference to the accompanying drawings, the embodiments of the present invention are explained in detail.

1. Outline of Embodiment

First, an outline is explained on typical embodiments of the invention disclosed in the present application. A numerical symbol in parentheses referring to a component of the drawing in the outline explanation about the typical embodiments only illustrates what is included in the concept of the component to which the numerical symbol is attached.

(1)<<Coefficient replacement to a non-zero coefficient in a top MB>> An image encoding device according to a first viewpoint of the present invention (refer to FIG. 1) encodes a macroblock of an encoding target image by parallel processing sequentially from a top of a parallel processing area. The image encoding device comprises an encoding element provided for every parallel processing area. When quantized orthogonally-transformed coefficients obtained by quantizing a top macroblock of the parallel processing area are all zero, the encoding element suppresses generation of a skip macroblock in the top macroblock of each parallel processing area, by adding a non-zero coefficient to a part of the quantized orthogonally-transformed coefficients and changing the part to non-zero.

(2) The image encoding device according to a more specific mode of the item (1) comprises an encoding element provided for every parallel processing area, as in the above. The encoding element includes an orthogonal transformation unit, a quantizer, a coefficient compensation unit, a variable-length encoder, and a quantization parameter calculating unit. The orthogonal transformation unit transforms orthogonally an image difference value between data of an encoding target image and data of a reference image. The quantizer quantizes the orthogonally-transformed coefficients orthogonally transformed by the orthogonal transformation unit and outputs quantized orthogonally-transformed coefficients. The coefficient compensation unit inputs the quantized orthogonally-transformed coefficients outputted by the quantizer. When the quantized orthogonally-transformed coefficients of a top macroblock of each of the processing area are all zero, the coefficient compensation unit outputs the quantized orthogonally-transformed coefficients concerned partly replaced with a non-zero coefficient, and when the quantized orthogonally-transformed coefficients are not all zero, the coefficient compensation unit outputs the quantized orthogonally-transformed coefficients concerned as they are. The encoder encodes the quantized orthogonally-transformed coefficients and necessary encoding information outputted by the coefficient compensation unit. The quantization parameter calculating unit generates a quantization parameter to be supplied to the quantizer and the encoder.

(3)<<Replacement position of a non-zero coefficient>> In the item (2), the non-zero coefficient replaced and outputted by the coefficient compensation unit is a one-valued coefficient. Increase of the amount of data by the replacement to the non-zero coefficient becomes small as much as possible.

(4) The image encoding device of the item (2) further comprises: an inverse quantization unit which quantizes inversely the quantized orthogonally-transformed coefficients outputted by the coefficient compensation unit; an inverse orthogonal transformation unit which transforms inverse-orthogonally the orthogonally-transformed coefficients outputted by the inverse quantization unit; an adder which generates a local decoded image by adding the reference image to an image difference value outputted by the inverse orthogonal transformation unit; an intra prediction image generating unit which generates an intra prediction image which is an intra-frame prediction image, based on the local decoded image; a deblocking filter unit which performs deblocking filtering to the local decoded image; an inter prediction image generating unit which generates an inter prediction image which is an inter-frame prediction image, based on an input image and the local decoded image after deblock-filtered; and a selector which selects, as the reference image, one of the intra prediction image outputted by the intra prediction image generating unit and the inter prediction image outputted by the inter prediction image generating unit.

(5) <<Change of a coded block pattern>> An image encoding device according to a second viewpoint of the present invention (refer to FIGS. 3 and 4) encodes a macroblock of an encoding target image by parallel processing sequentially from a top of a parallel processing area. The image encoding device comprises an encoding element provided for every parallel processing area. When quantized orthogonally-transformed coefficients of the top macroblock in the parallel processing area are all zero, the encoding element suppresses generation of a skip macroblock in the top macroblock of each parallel processing area, by generating a coded block pattern denoting existence of a non-zero coefficient.

(6) <<Change of a coded block pattern>> The image encoding device according to a more specific mode of the item (5) comprises an encoding element provided for every parallel processing area, as in the item (5). The encoding element includes an orthogonal transformation unit, a quantizer, a variable-length encoder, and a quantization parameter calculating unit. The orthogonal transformation unit transforms orthogonally an image difference value between data of an encoding target image and data of a reference image. The quantizer quantizes the orthogonally-transformed coefficients orthogonally transformed by the orthogonal transformation unit and outputs quantized orthogonally-transformed coefficients. The encoder encodes the quantized orthogonally-transformed coefficients and necessary encoding information outputted by a coefficient compensation unit. The quantization parameter calculating unit generates a quantization parameter to be supplied to the quantizer and the encoder. When the quantized orthogonally-transformed coefficients of the top macroblock of the processing area are all zero, the encoder generates a coded block pattern denoting existence of a non-zero coefficient, in exchange for a coded block pattern denoting that the quantized orthogonally-transformed coefficients are all zero.

(7) In the item (6), when the quantized orthogonally-transformed coefficients of the top macroblock of the processing area are all zero, the encoding information generated by the encoder excludes the quantized orthogonally-transformed coefficients.

(8) <<Allowance of a skip MB, replacement to a non-zero coefficient in the last MB>> An image encoding device according to a third viewpoint of the present invention (refer to FIG. 5) encodes a macroblock of an encoding target image by parallel processing sequentially from a top of a parallel processing area. The image encoding device comprises an encoding element provided for every parallel processing area. The encoding element suppresses generation of a skip macroblock in a last macroblock of each parallel processing area, by encoding the last macroblock of a parallel processing area using the same quantization parameter as used in a top macroblock of a succeeding parallel processing area adjoining across a parallel processing area boundary, allowing generation of a skip macroblock in a top macroblock of each parallel processing area, and adding a non-zero coefficient to a part of the quantized orthogonally-transformed coefficients and changing the part to non-zero when the quantized orthogonally-transformed coefficients of the last macroblock of the parallel processing area are all zero.

(9) The image encoding device according to a more specific mode of the item (8) comprises an encoding element provided for every parallel processing area as in the item (8), and comprises a quantization parameter controlling unit. The encoding element includes an orthogonal transformation unit, a quantizer, a coefficient compensation unit, an encoder, and a quantization parameter calculating unit. The orthogonal transformation unit transforms orthogonally an image difference value between data of an encoding target image and data of a reference image. The quantizer quantizes the orthogonally-transformed coefficients orthogonally transformed by the orthogonal transformation unit and outputs quantized orthogonally-transformed coefficients. The coefficient compensation unit inputs the quantized orthogonally-transformed coefficients outputted by the quantizer. When the quantized orthogonally-transformed coefficients of a last macroblock of each of the processing area are all zero, the coefficient compensation unit outputs the quantized orthogonally-transformed coefficients concerned partly replaced with a non-zero coefficient, and when the quantized orthogonally-transformed coefficients are not all zero, the coefficient compensation unit outputs the quantized orthogonally-transformed coefficients concerned as they are. The encoder encodes the quantized orthogonally-transformed coefficients and necessary encoding information outputted by the coefficient compensation unit. The quantization parameter calculating unit generates a quantization parameter to be supplied to the quantizer and the encoder. The quantization parameter controlling unit performs control so as to use the same quantization parameter to a top macroblock of each processing area and a last macroblock of an adjoining preceding processing area, in each of the encoding element.

(10) In the item (9), the quantization parameter controlling unit acquires and holds a quantization parameter of a top macroblock of every parallel processing area, generated by the respective quantization parameter calculating unit in each encoding element, and the quantization parameter controlling unit performs control so that, in processing the last macroblock of every processing area, the same quantization parameter as used in the top macroblock of a succeeding processing area adjoining to the macroblock concerned is used.

(11) In the item (9), the non-zero coefficient replaced and outputted by the coefficient compensation unit is a one-valued coefficient.

(12) <<Allowance of a skip MB, coded block pattern change>> An image encoding device according to a fourth viewpoint of the present invention (refer to FIG. 6) encodes a macroblock of an encoding target image by parallel processing sequentially from a top of a parallel processing area. The image encoding device comprises an encoding element provided for every parallel processing area. The encoding element suppresses generation of a skip macroblock in a last macroblock of each parallel processing area, by encoding the last macroblock of a parallel processing area using the same quantization parameter as used in a top macroblock of a succeeding parallel processing area adjoining area across a parallel processing area boundary, by allowing generation of a skip macroblock in a top macroblock of each parallel processing area, and generating encoding information including a coded block pattern denoting existence of a non-zero coefficient when the quantized orthogonally-transformed coefficients of the last macroblock of the parallel processing area is all zero.

(13) The image encoding device according to a more specific mode of the item (12) comprises an encoding element provided for every parallel processing area as in the item (12). The encoding element includes an orthogonal transformation unit, a quantizer, an encoder, and a quantization parameter calculating unit. The orthogonal transformation unit transforms orthogonally an image difference value between data of an encoding target image and data of a reference image. The quantizer quantizes the orthogonally-transformed coefficients orthogonally transformed by the orthogonal transformation unit and outputs the quantized orthogonally-transformed coefficients. The encoder encodes the quantized orthogonally-transformed coefficients and necessary encoding information outputted by a coefficient compensation unit. The quantization parameter calculating unit generates a quantization parameter to be supplied to the quantizer and the encoder. The image encoding device comprises furthermore a quantization parameter controlling unit which controls the respective encoding element so as to use the same quantization parameter to a top macroblock of every processing area and to a last macroblock of an adjoining preceding processing area. When the quantized orthogonally-transformed coefficients of the last macroblock of the processing area are all zero, the encoder generates a coded block pattern denoting existence of a non-zero coefficient, in exchange for a coded block pattern denoting that the quantized orthogonally-transformed coefficients are all zero.

(14) In the item (13), the quantization parameter controlling unit acquires and holds a quantization parameter of a top macroblock of every parallel processing area, generated by the respective quantization parameter calculating unit in each encoding element. The quantization parameter controlling unit performs control so that, in processing a last macroblock of every processing area, the same quantization parameter as used in a top macroblock of a succeeding processing area adjoining to the macroblock concerned is used.

(15) In the item (13), when the quantized orthogonally-transformed coefficients of a top macroblock of every processing area are all zero, encoding information generated by the encoder excludes the quantized orthogonally-transformed coefficients.

2. Details of Embodiments

Embodiments are explained further in full detail. Hereafter, the embodiments for practicing the present invention are explained in detail based on drawings. In the entire diagrams for explaining the embodiments of the present invention, the same symbol is attached to an element which possesses the same function, and the repeated explanation thereof is omitted.

<<Embodiment 1<<

Figure 2:
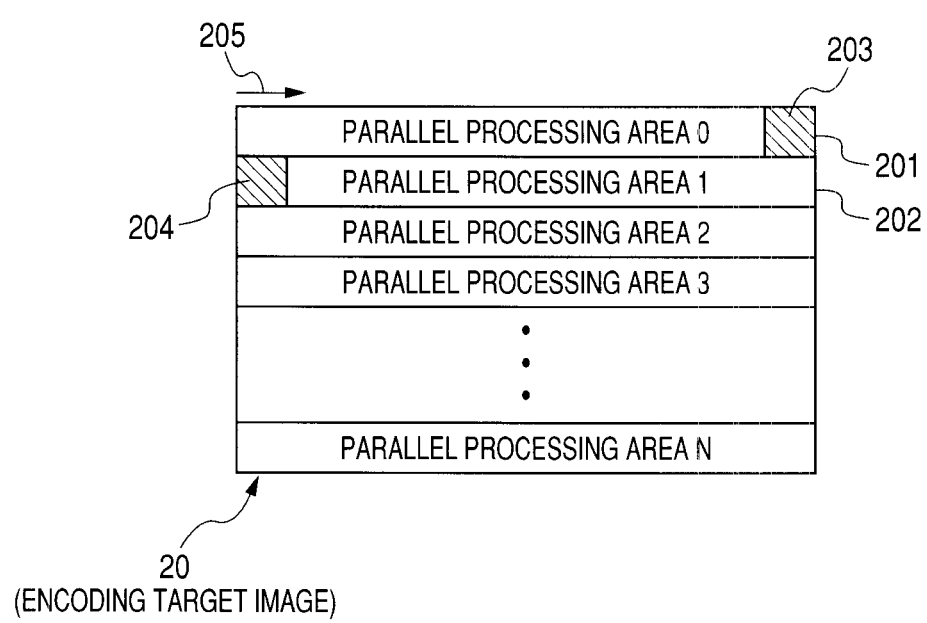
FIG. 2 is an explanatory view illustrating plural parallel processing areas in an encoding target image and macroblocks in each parallel processing area.

FIG. 1 illustrates configuration of an image encoding device according to an embodiment of the present invention. An image encoding device 1 illustrated in FIG. 1 encodes a macroblock of an encoding target image by parallel processing sequentially from the top of a parallel processing area, in conformity with H.264 and possesses encoding elements 120-122 provided for every parallel processing area. For example, when an area 20 in FIG. 2 is assumed to be an encoding target image, one rectangle typically illustrated by rectangles 203, 204 stands for a macroblock. A macroblock is a set of 16×16 pixels. The area of one line of macroblocks in the encoding target image 20 is a parallel processing area as illustrated by a rectangle 202. In FIG. 2, it is seen that the encoding target image 20 is comprised of from a parallel processing area 0 to a parallel processing area N. The image encoding device 1 performs encoding in parallel, in the direction of an arrow 205, from the macroblock of the left end top in units of macroblock sequentially, to each from the parallel processing area 0 to the parallel processing area N. The encoding elements 120 to 122 typically illustrated in FIG. 1 correspond to the parallel processing areas 0 to 2, respectively.

The configuration of one encoding element 120 of which the details are typically illustrated is explained with reference to FIG. 1. In FIG. 1, an orthogonal transformation unit 101 performs orthogonal transformation of an difference image between an input image of the corresponding parallel processing area and a reference image. A quantizer 102 quantizes the orthogonally-transformed coefficients obtained by the orthogonal transformation unit 101. An element 130 is a coefficient compensation unit of which the details will be described later, and an element 114 is an area-top MB determination unit. A variable-length encoder 103 performs variable-length encoding of the orthogonally-transformed coefficients and necessary encoding information after quantization, obtained by the coefficient compensation unit 130. An inverse quantization unit 104 performs inverse quantization of the orthogonally-transformed coefficients after quantization, obtained by the coefficient compensation unit 130. An inverse orthogonal transformation unit 105 performs inverse orthogonal transformation of the orthogonally-transformed coefficients which are inversely quantized by the inverse quantization unit 104. An adder 110 adds the image difference value obtained by the inverse orthogonal transformation unit 105 and an reference image, and generates a local decoded image. An intra prediction image generating unit 107 generates an intra prediction image which is an intra-frame prediction image, based on the local decoded image outputted from the adder 110. A deblocking filter unit 106 performs deblocking filtering to the local decoded image outputted from the adder 110. An inter prediction image generating unit 108 generates an inter prediction image which is an inter-frame prediction image, based on the input image and the local decoded image which is deblock-filtered by the deblocking filter unit 106. A selector 109 selects, as the reference image, one of the intra prediction image generated by the intra prediction image generating unit 107 and the inter prediction image generated by the inter prediction image generating unit 108, according to image compression algorithm. A subtractor 111 calculates difference of the input image and the reference image. The quantization parameter is determined by a quantization parameter calculating unit 112 and supplied to the quantizer 102, the variable-length encoder 103, the inverse quantization unit 104, and the deblocking filter unit 106. The configuration of the elements other than the coefficient compensation unit 130 is the general configuration of an encoding device according to H.246. The other encoding elements are also configured similarly. The variable-length codes obtained in each encoding element are integrated by a stream integration unit 123 to generate a final bit stream. Accordingly, the parallel encoding is realized. In FIG. 1, the encoding device possesses, as an example, three parallel encoding elements 120, 121, and 122, each of which possesses the same configuration. However, the number of paralleling is arbitrary. Furthermore, the other portions of each encoding element may be different, as long as the configuration described above is maintained. It is also possible to make the output of the variable-length encoder 103 the fixed length data, and to perform variable-length encoding collectively by the stream integration unit 123.

The coefficient compensation unit 130 serves as a circuit block which suppresses generation of a skip macroblock in the top macroblock of each parallel processing area. That is, when all the quantized orthogonally-transformed coefficients of the top macroblock of the parallel processing area are zero, the coefficient compensation unit 130 adds a non-zero coefficient to a part of the quantized orthogonally-transformed coefficients and changes the part to non-zero. Specifically, the coefficient compensation unit 130 includes a coefficient existence/nonexistence determination unit 113, a coefficient addition determination unit 115, a coefficient adding unit 116, a selector 117, and a selector 118. The area-top MB determination unit 114 determines whether the current processing target macroblock of a parallel processing area is a top macroblock. The coefficient existence/nonexistence determination unit 113 determines whether all the orthogonally-transformed coefficients after quantization (quantized orthogonally-transformed coefficients) corresponding to one macroblock obtained by the quantizer 102 are zero-valued coefficients. Based on the determination result of the area-top MB determination unit 114 determining whether the current processing target macroblock is a top macroblock, and the determination result of the coefficient existence/nonexistence determination unit 113 determining whether all the quantized orthogonally-transformed coefficients are zero, the coefficient addition determination unit 115 determines whether a non-zero coefficient is added to a part of the quantized orthogonally-transformed coefficients of the current macroblock, and controls switching of the selectors 117 and 118. That is, when the current macroblock is not a top macroblock, or when the current macroblock is a top macroblock but a non-zero coefficient is included, the output of the quantizer 102 is through outputted to the variable-length encoder 103 as it is. On the other hand, when the current macroblock is a top macroblock and a non-zero coefficient is not included at all, the output of the quantizer 102 is outputted to the variable-length encoder 103 after a non-zero coefficient is added to a part of the output of the quantizer 102 by the coefficient adding unit 116. In other words, the output of the quantizer 102 is partly replaced by a non-zero coefficient by the coefficient adding unit 116, and is outputted to the variable-length encoder 103.

Furthermore, the parallel encoding is totally explained with reference to FIGS. 1 and 2. In FIG. 2, the areas 201 and 202 represent parallel processing areas in the encoding target image 20, and are encoded in parallel by the different encoding elements 120 and 121, respectively. The symbol 203 represents the last MB of the parallel processing area 201, and the symbol 204 represents the top MB of the parallel processing area 202.

In moving image encoding, all values of the quantized orthogonally-transformed coefficients obtain by the quantizer 102 may be zero in some cases. According to the H.264 standard, when all the orthogonally-transformed coefficients are zero, a quantization parameter will not be added to the macroblock concerned of the stream after the variable-length encoding obtained by the stream integration unit 123, but the macroblock concerned will be processed in decoding using the quantization parameter of the adjoining previous MB. Namely, when all values of the quantized orthogonally-transformed coefficients of the top MB 204 of the parallel processing area in FIG. 2 are zero, in decoding, the quantization parameter of the last MB 203 of the parallel processing area is used. In order to correspond to the case, in encoding, the top MB 204 must be processed using the quantization parameter of the last MB 203 of the parallel processing area. Since the parallel processing area 201 and the parallel processing area 202 are processed in parallel, the quantization parameter of the last MB 203 of the parallel processing area 201 and the quantization parameter of the top MB 204 of the parallel processing area 202 do not necessarily agree. In short, when parallel processing is sequentially performed in the direction of the arrow 205 from the top in each parallel processing area, the processing of the last MB 203 is performed after the processing of the top MB 204 finishes, therefore, it is anticipated that decoding might be performed using a wrong quantization parameter.

In order to avoid the case, a possible method is to form a slice in units of processing area, and to add a quantization parameter to the top MB of the processing area. Since prediction between macroblocks crossing slices is no longer applied in the method, the amount of code will increase, and the encoding efficiency will decrease. Another possible method to avoid the case is to fix the quantization parameter in a picture. If the quantization parameter is fixed in a picture, quantization parameters do not differ in macroblocks across a parallel processing area boundary; therefore, encoding is performed normally. However, by fixing the quantization parameter, the rate may start to disagree, and the control of the quantization parameter depending on an image may become difficult; therefore, image quality is considered to deteriorate.

Figure 8:
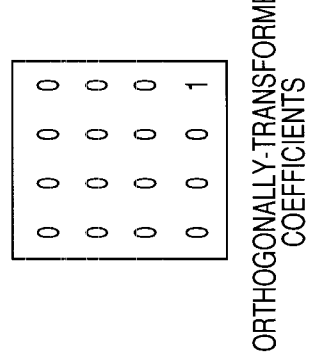
FIG. 8 is an explanatory view illustrating a position of a non-zero coefficient to replace a part of zero-valued coefficients which are quantized and orthogonally transformed.

According to the present embodiment, by making non-zero a part of the orthogonally-transformed coefficients of the top MB of a processing area, generation of a skip macroblock is suppressed, and reference of the quantization parameter between consecutive macroblocks across a parallel processing area boundary becomes unnecessary. In FIG. 1, the area-top MB determination unit 114 determines the MB position, and the coefficient existence/nonexistence determination unit 113 determines whether all the quantized orthogonally-transformed coefficients obtained by the quantizer 102 are zero. When a non-zero coefficient is not included in the quantized orthogonally-transformed coefficients of the top macroblock at all, the processing which replaces at least one zero-valued coefficient by a non-zero coefficient is performed. It is sufficient if at least one piece of non-zero orthogonally-transformed coefficient exists in a macroblock. For example, in the luminance component or the chrominance component, the position of a non-zero orthogonally-transformed coefficient may be at any one of 64 coefficients in 64 pixels in the case of the conversion of 8×8 macroblocks, and at any one of 16 coefficients in 16 pixels in the case of the conversion of 4×4 macroblocks. Furthermore, it is enough if at least one piece of non-zero coefficient exists in the 64 coefficients in 64 pixels or in the 16 coefficients in 16 pixels. More specifically, when the image to encode is extremely flat, a non-zero coefficient is added to the position of the DC component, and when the image to encode is with many high frequency components, a non-zero coefficient is added to a position of a higher frequency component in the AC components, as illustrated in FIG. 8. In this way, it is possible to make the influence not visually noticeable by changing the addition position depending on the image. On the other hand, the addition position may be determined by a random number.

According to Embodiment 1, as illustrated in FIG. 2, when all the orthogonally-transformed coefficients of the top MB 204 of the parallel processing area 1 are zero, a quantization parameter is added to the stream after variable-length encoding, by adding a non-zero coefficient to a part of the orthogonally-transformed coefficients compulsorily; therefore, it is possible to generate a stream which can be decoded correctly. Since it is not necessary to form slices, the prediction is applied across a parallel processing area boundary, and encoding efficiency improves. An error is not generated in the filtering by the deblocking filter unit 106. Furthermore, since the quantization parameter in a picture can be unfixed, it is possible to realize a high-quality image by the rate control and the control of the quantization parameter depending on an image.

<<Embodiment 2<<

Figure 3:
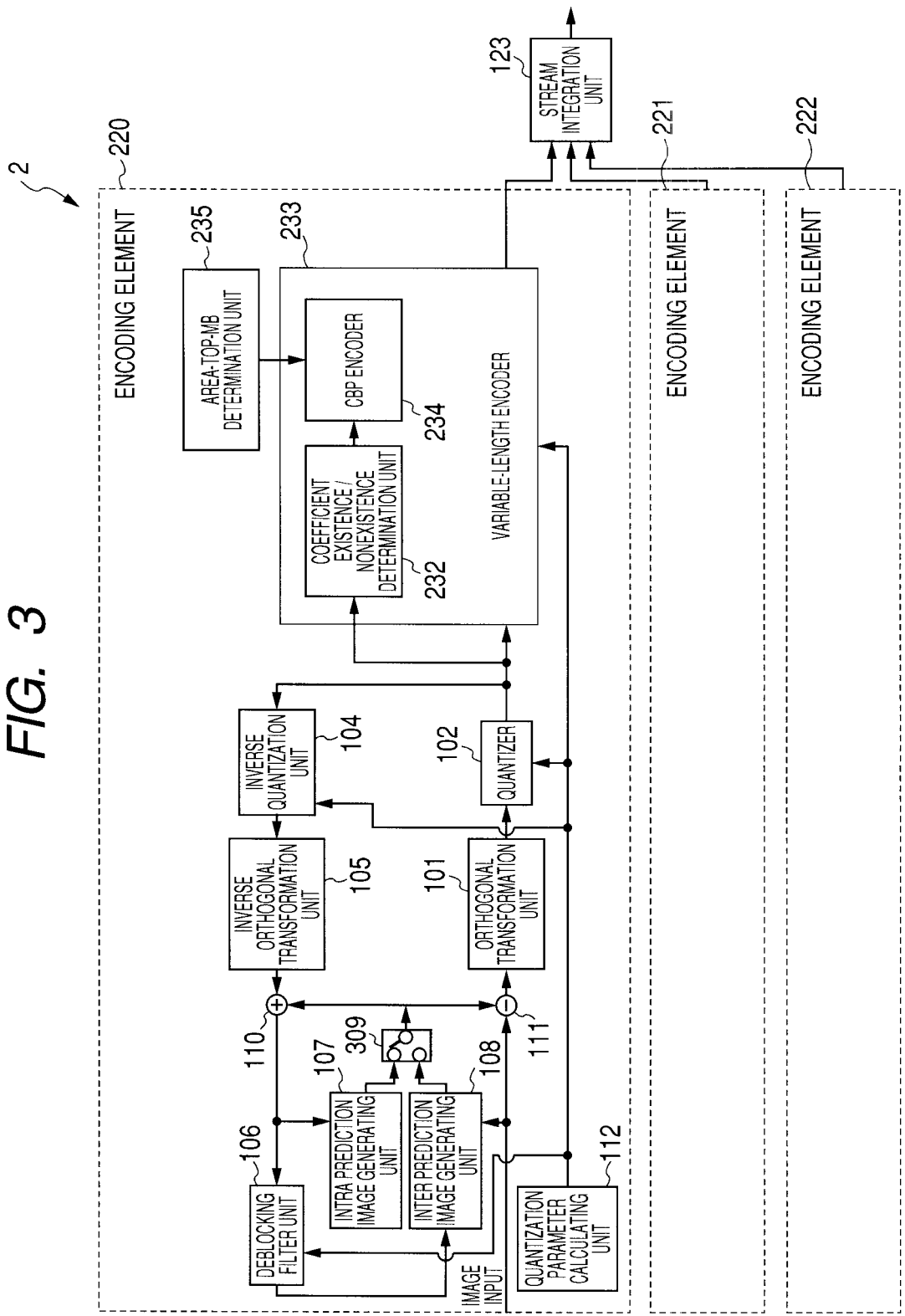
FIG. 3 is a block diagram illustrating configuration of a second image encoding device according to the present invention.

FIG. 3 illustrates configuration of an image encoding device according to another embodiment of the present invention. The configuration of FIG. 1 employs the coefficient compensation unit 130 in order to suppress the generating of a skip macroblock in the processing of a top macroblock of a parallel processing area. On the contrary, an image encoding device 2 of FIG. 3 suppresses the generating of a skip macroblock by the processing of a variable-length encoder 233.

FIG. 3 is different from FIG. 1 in the point that a variable-length encoder 233 and an area-top MB determination unit 235 are employed, in place of the coefficient compensation unit 130 and the variable-length encoder 103 of FIG. 1. The area-top MB determination unit 235 possesses the same function as the area-top MB determination unit 114 of FIG. 1. The other circuit blocks possessing the same function as in FIG. 1 are attached with the same reference symbols as in FIG. 1, and the detailed explanation thereof is omitted. In FIG. 3, the inverse quantization unit 104 inputs the quantized orthogonally-transformed coefficients outputted from the quantizer 102.

The area-top MB determination unit 235 determines whether the current processing target macroblock of a parallel processing area is a top macroblock. In addition to the variable-length coding function in conformity with H.264, the variable-length encoder 233 possesses a coefficient existence/nonexistence determination unit 232 and a coded block pattern (CBP) encoder 234. The coefficient existence/nonexistence determination unit 232 determines whether all the orthogonally-transformed coefficients after quantization (quantized orthogonally-transformed coefficients) corresponding to one macroblock obtained by the quantizer 102 are zero-valued coefficients. The CBP encoder 234 receives the top MB determination result of a parallel processing area obtained by the area-top MB determination unit 235, and the determination result obtained by the coefficient existence/nonexistence determination unit 232 determining whether all the quantized orthogonally-transformed coefficients are zero, and encodes a coded block pattern (coded_block_pattern) in the syntax of H.264. When all the quantized orthogonally-transformed coefficients are zero in the case of the processing to the top macroblock of a parallel processing area, the CBP encoder 234 performs processing so that the coded block pattern denoting the existence of a non-zero coefficient is set, in exchange for the coded block pattern denoting that all the quantized orthogonally-transformed coefficients are zero, and that "mb_qp_delta" may always be added to a bit stream. According to H.264, "mb_qp_delta" is the difference of the quantization parameter between adjoining macroblocks included in an encoding stream, or in short, it is difference information using the quantization parameter used for quantization of the macroblock concerned.

Figure 4:
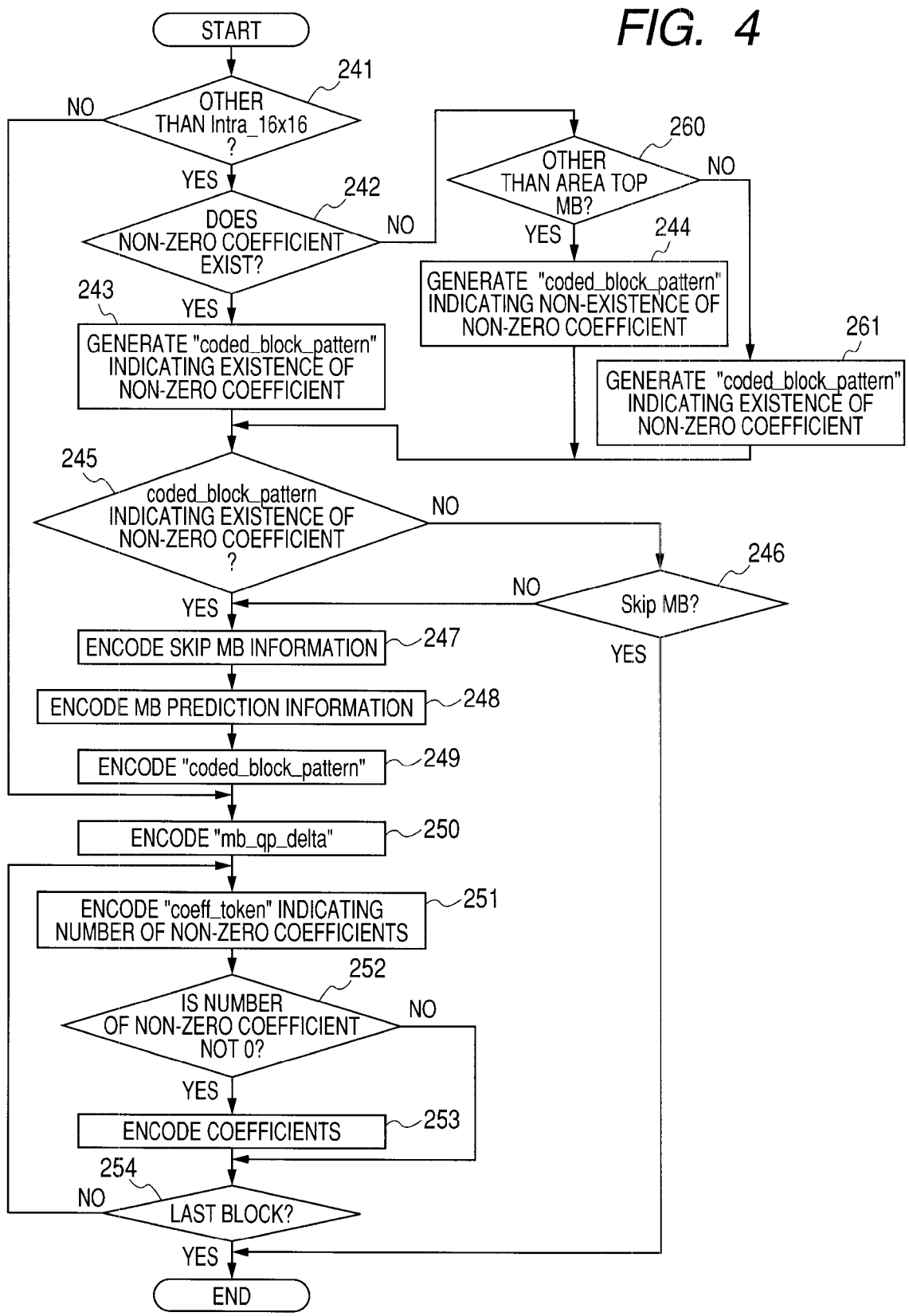
FIG. 4 is a flow chart illustrating an encoding procedure by a variable-length encoder.
Figure 7:
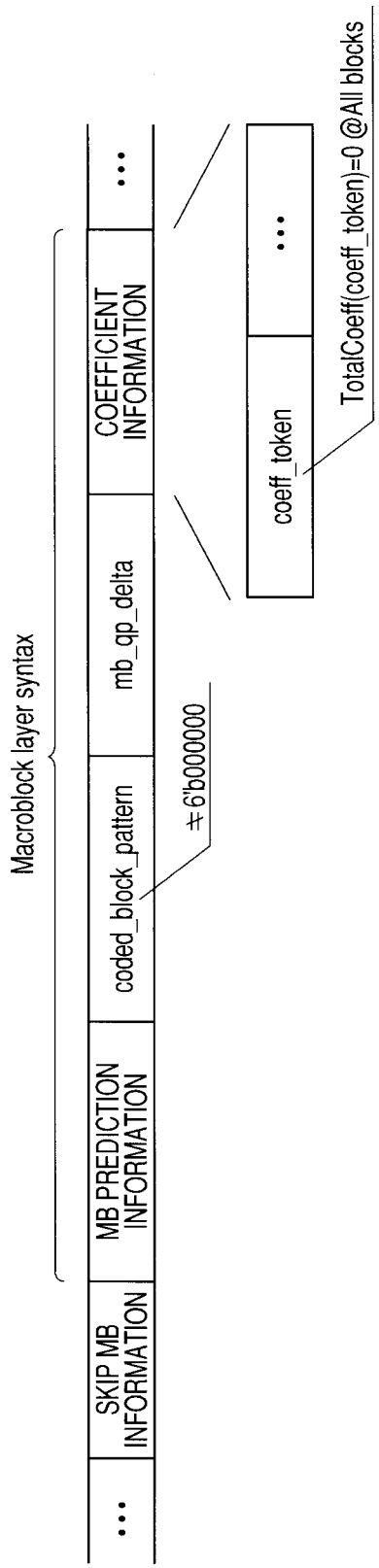
FIG. 7 is an explanatory chart of a macroblock syntax as variable-length coding information to which variable length encoding is performed.

FIG. 4 is a flow chart illustrating an encoding procedure by the variable-length encoder 233. At Step S241, it is determined whether the encoding format of MB is Intra_16×16, and, in the case of Intra_16×16, the flow branches to Step S250. At Step S242, it is determined whether there is any non-zero coefficient. At Step S243, "coded_block_pattern" which indicates the existence of non-zero coefficient is generated. At Step S244, "coded_block_pattern" which indicates the nonexistence of non-zero coefficient is generated. According to the determination at Step S242, when there is a non-zero coefficient, Step S243 is practiced, and when there is no non-zero coefficient, Step S244 is practiced. At Step S245, it is determined whether "coded_block_pattern" indicates the existence of non-zero coefficient. When "coded_block_pattern" indicates the nonexistence of non-zero coefficient, the flow branches to Step S246. At Step S246, it is determined whether the target macroblock is a skip macroblock (Skip MB). When the target macroblock is a skip macroblock (Skip MB), all the subsequent steps are skipped. At Step S247, the skip MB information which indicates how many skip MBs have existed before is encoded. At Step S248, MB prediction information (Macroblock Prediction information in H.264) is encoded. At Step S249, a coded block pattern (coded_block_pattern) is encoded. At Step S250, "mb_qp_delta" is encoded. At Step S251, "coeff_token" which indicates the number of non-zero coefficients is encoded. At Step S252, it is determined whether the number of non-zero coefficients is zero. At Step S253, the coefficients are encoded. At Step S252, when the number of non-zero coefficients is zero, Step S253 is skipped and the coefficients are not encoded. At Step S254, it is determined whether the current block is the last block. When the current block is not the last block, a loop of Steps S251-S253 is repeated. The above description indicates a general flow of the H.264 coding. In the present invention, Steps S260 and S261 are added. At Step S260, the area-top MB determination unit 235 determines whether the current macroblock is a top MB. At Step S261, the CBP encoder 234 generates "coded_block pattern" which indicates existence of non-zero coefficient. Even when it is determined at Step S242 that there is no non-zero coefficient, if the area-top MB determination unit 235 determines at Step S260 that the current macroblock is a top MB, "coded_block_pattern" which indicates existence of non-zero coefficient is generated at Step S261. As a result, "mb_qp_delta" is added at Step S250, and since the number of non-zero coefficients is zero, Step S253 is skipped, and the coefficients are not encoded. The skip MB information, the MB prediction information, "coded_block_pattern", "mb_qp_delta", and "coeff_token" are syntax elements which configure the macroblock syntax (Macroblock Layer Syntax) as the variable-length coding information to be variable-length-encoded as illustrated in FIG. 7.

By employing the image encoding device 2 according to Embodiment 2, it becomes possible to add a quantization parameter into a stream after variable-length encoding even when all the quantized orthogonally-transformed coefficients of an area-top MB are zero, and the stream which can guarantee the correct decoding can be generated. Since it is not necessary to form slices, the prediction is applied across a parallel processing area boundary, and encoding efficiency improves. Furthermore, since the quantization parameter in a picture can be unfixed, it is possible to realize a high-quality image by the rate control and the control of the quantization parameter depending on an image. Even when compared with Embodiment 1, since all quantized orthogonally-transformed coefficients with a poor encoding efficiency remain to be zero, the encoding efficiency is high, and a satisfactory image quality can be obtained.

<<Embodiment 3<<

Figure 5:
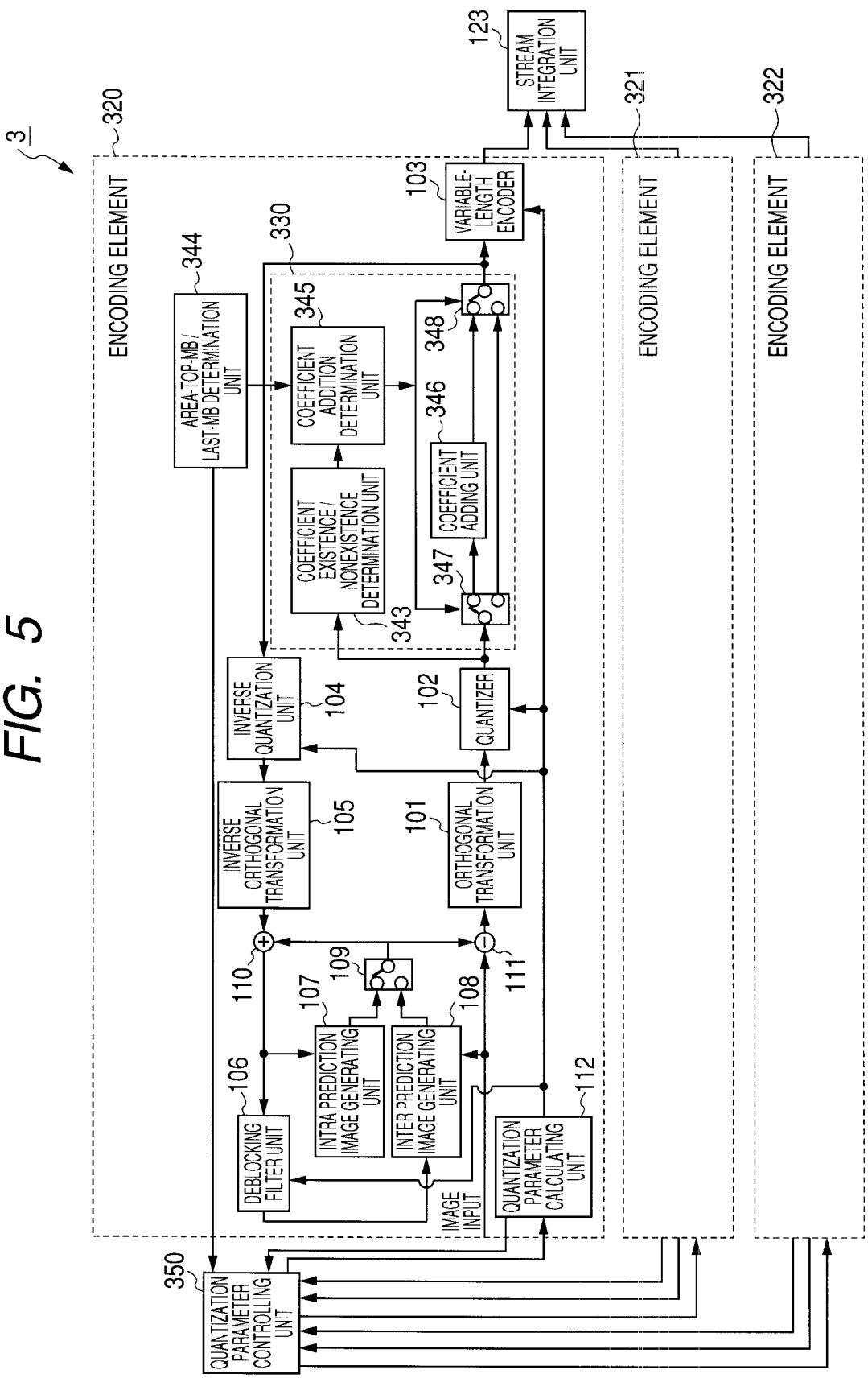
FIG. 5 is a block diagram illustrating configuration of a third image encoding device according to the present invention.

FIG. 5 illustrates configuration of an image encoding device according to further another embodiment of the present invention. An image encoding device 3 of FIG. 5 employs the configuration in which, by using a coefficient compensation unit similar to FIG. 1, an equal quantization parameter is assigned to a top macroblock and a last macroblock which sandwich a parallel processing area boundary, and the generation of a skip macroblock in the last macroblock lying across the parallel processing area boundary is suppressed. Difference with FIG. 1 is as follows. In each of encoding elements 320-322, an area-top-MB/last-MB determination unit 344 is employed in place of the area-top MB determination unit 114, a quantization parameter controlling unit 350 common to all the encoding elements 320-322 is provided, and a coefficient compensation unit 330 similar to the coefficient compensation unit 130 is provided.

The area-top-MB/last-MB determination unit 344 determines whether a processing target macroblock of a parallel processing area is a top MB or a last MB. The determination result is supplied to the quantization parameter controlling unit 350 and a coefficient addition determination unit 345.

The quantization parameter controlling unit 350 holds a quantization parameter used when encoding the top macroblock of the parallel processing area, and encodes the last macroblock of the adjoining region using the held quantization parameter. By this scheme, reference of the quantization parameter crossing the parallel processing area boundary of the parallel processing area is enabled. In other words, it is allowed that the top macroblock of a parallel processing area is a skip macroblock. At this time, when all the quantized orthogonally-transformed coefficients of the last macroblock of the adjoining area are zero, the macroblock concerned is suppressed to become a skip macroblock, using the coefficient compensation unit, and generation of contradiction that quantization parameters are different between the last macroblock concerned and the preceding macroblock is suppressed.

The coefficient compensation unit 330 serves as a circuit block in which, when all the quantized orthogonally-transformed coefficients of the last macroblock of the parallel processing area are zero, generation of a skip macroblock in the last macroblock of each parallel processing area is suppressed, by adding a non-zero coefficient to a part of the quantized orthogonally-transformed coefficients and changing the part to non-zero. Specifically, the coefficient compensation unit 330 includes a coefficient existence/nonexistence determination unit 343, a coefficient addition determination unit 345, a coefficient adding unit 346, a selector 347, and a selector 348. The coefficient existence/nonexistence determination unit 343 determines whether all the orthogonally-transformed coefficients after quantization (quantized orthogonally-transformed coefficients) corresponding to one macroblock obtained by the quantizer 102 are zero-valued coefficients. Based on the determination result of the area-top-MB/last-MB determination unit 344 determining whether the current processing target macroblock is a last macroblock, and the determination result of the coefficient existence/nonexistence determination unit 343 determining whether all the quantized orthogonally-transformed coefficients are zero, the coefficient addition determination unit 345 determines whether a non-zero coefficient is added to a part of the quantized orthogonally-transformed coefficients of the current macroblock, and controls switching of the selectors 347 and 348. That is, when the current macroblock is not a last macroblock, or when the current macroblock is a last macroblock but a non-zero coefficient is included, the output of the quantizer 102 is through outputted to the variable-length encoder 103 as it is. On the other hand, when the current macroblock is a last macroblock and the non-zero coefficient is not included at all, the output of the quantizer 102 is outputted to the variable-length encoder 103 after a non-zero coefficient is added to a part of the output of the quantizer 102 by the coefficient adding unit 346. In other words, the output of the quantizer 102 is partly replaced by a non-zero coefficient by the coefficient adding unit 346, and is outputted to the variable-length encoder 103. As for the non-zero coefficient replaced, the processing is the same as in the case of FIG. 1.

The quantization parameter controlling unit 350 controls a quantization parameter depending on the determination result of the area-top-MB/last-MB determination unit 344. When the determination result indicates that the current macroblock is an area-top MB, the quantization parameter controlling unit 350 holds inside the quantization parameter currently outputted from the quantization parameter calculating unit 112. When the determination result indicates that the current macroblock is an area-last MB, the quantization parameter controlling unit 350 supplies the quantization parameter held at the top MB of the adjoining processing area to the quantization parameter calculating unit 112, to serve as the quantization parameter for the area-last MB. Although the present example illustrates the control which quantizes an area-last MB using the quantization parameter calculated at the area-top MB, the control which encodes the area-top MB and the area-last MB using the quantization parameter set up from the exterior is also possible.

In the image encoding device 3 of FIG. 5, the decoding using the quantization parameter of the last MB 203 of the parallel processing area 201 becomes possible, as shown in FIG. 2, when all the orthogonally-transformed coefficients of the top MB 204 of the parallel processing area 202 are zero. Also when all the orthogonally-transformed coefficients of an area-last MB are zero, a quantization parameter can be added to a stream after variable-length encoding, by adding a non-zero coefficient compulsorily by the coefficient compensation unit 330; therefore, it is possible to generate a stream which can be decoded correctly. Since it is not necessary to form slices, the prediction is applied across a parallel processing area boundary, and encoding efficiency improves. Furthermore, since the quantization parameter in a picture can be unfixed, it is possible to realize a high-quality image by the rate control and the control of the quantization parameter depending on an image.

<<Embodiment 4<<

Figure 6:
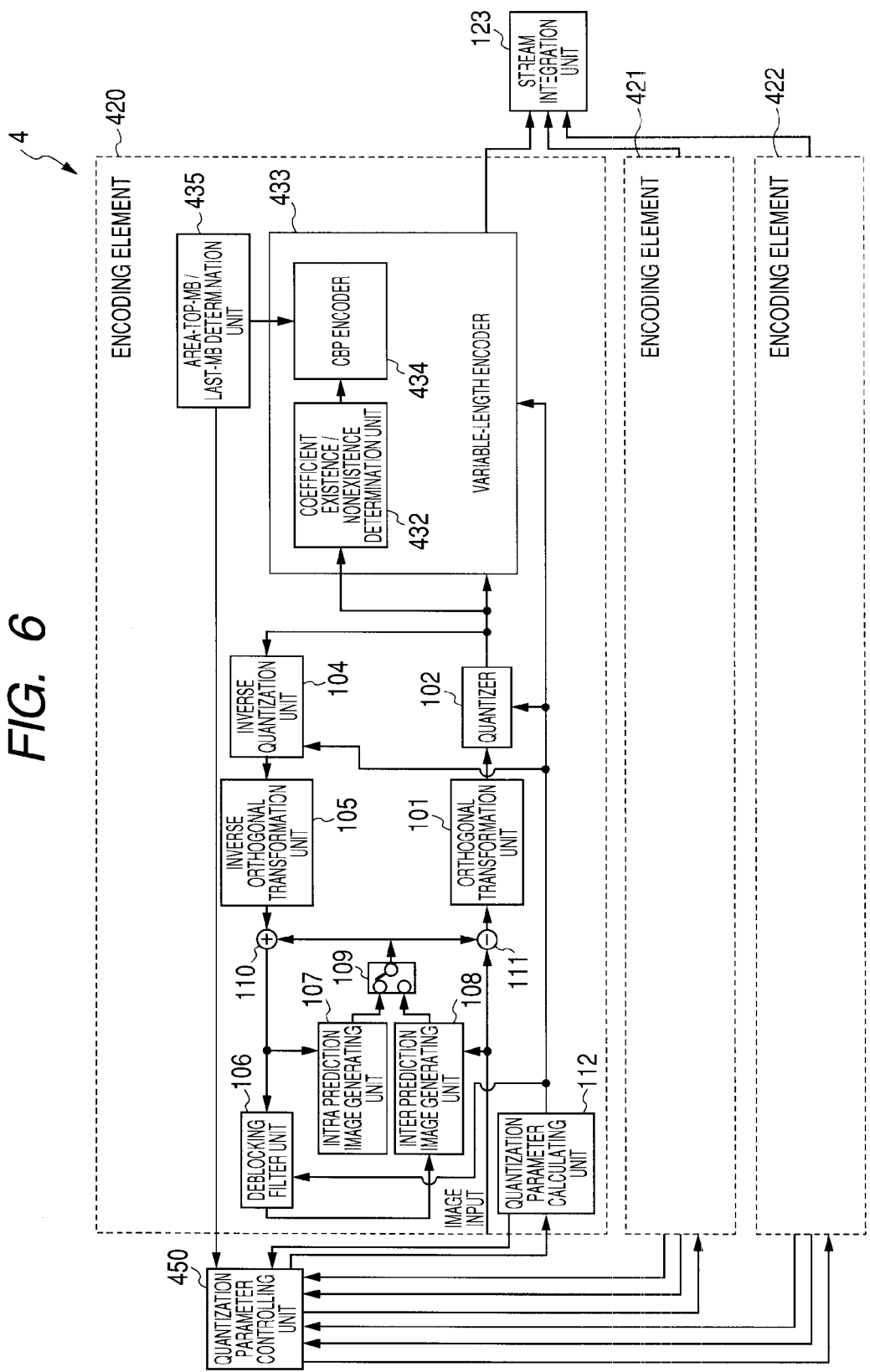
FIG. 6 is a block diagram illustrating configuration of a fourth image encoding device according to the present invention.

FIG. 6 illustrates configuration of an image encoding device according to yet another embodiment of the present invention. An image encoding device 4 of FIG. 6 employs the configuration in which, by using a variable-length encoder 433 similar to FIG. 3, an equal quantization parameter is assigned to a top macroblock and a last macroblock which sandwich a parallel processing area boundary, and the generation of a skip macroblock in the last macroblock lying across the parallel processing area boundary is suppressed. Difference with FIG. 3 is as follows. An area-top-MB/last-MB determination unit 435 is employed in place of the area-top MB determination unit 235, in each of the encoding elements 420-422, a quantization parameter controlling unit 450 common to all the encoding elements 420-422 is provided, and a variable-length encoder 433 similar to the variable-length encoder 233 is provided.

The area-top-MB/last-MB determination unit 435 determines whether a processing target macroblock of a parallel processing area is a top MB or a last MB. The determination result is supplied to the quantization parameter controlling unit 450 and the CBP encoder 434.

The quantization parameter controlling unit 450 holds a quantization parameter used when encoding the top macroblock of the parallel processing area, and encodes the last macroblock of the adjoining area using the held quantization parameter. By this scheme, reference of the quantization parameter over the parallel processing area boundary of the parallel processing area is enabled. In other words, it is allowed that the top macroblock of a parallel processing area is a skip macroblock. At this time, when all the quantized orthogonally-transformed coefficients of the last macroblock of an adjoining area are zero, the macroblock concerned is suppressed to turn to a skip macroblock, by using the variable-length encoder 433, and generation of contradiction that quantization parameters are different between the last macroblock concerned and the preceding macroblock is suppressed.

In addition to the variable-length coding function in conformity with H.264, the variable-length encoder 433 possesses a coefficient existence/nonexistence determination unit 432 and a coded block pattern (CBP) encoder 434. The coefficient existence/nonexistence determination unit 432 determines whether all the orthogonally-transformed coefficients after quantization (quantized orthogonally-transformed coefficients) corresponding to one macroblock obtained by the quantizer 102 are zero-valued coefficients. The CBP encoder 434 receives the last MB determination result of a parallel processing area obtained by the area-top-MB/last-MB determination unit 435, and the determination result obtained by the coefficient existence/nonexistence determination unit 432 determining whether all the quantized orthogonally-transformed coefficients are zero, and encodes a coded block pattern (coded_block_pattern) in the syntax of H.264. When all quantized orthogonally-transformed coefficients are zero in the case of the processing to the last macroblock of a parallel processing area, the CBP encoder 434 performs processing so that the coded block pattern denoting the existence of a non-zero coefficient is set, in exchange for the coded block pattern denoting that all the quantized orthogonally-transformed coefficients are zero, and that "mb_qp_delta" may always be added to a bit stream.

The quantization parameter controlling unit 450 controls a quantization parameter depending on the determination result of the area-top-MB/last-MB determination unit 435. When the determination result indicates that the current macroblock is an area-top MB, the quantization parameter controlling unit 450 holds inside the quantization parameter currently outputted from the quantization parameter calculating unit 112. When the determination result indicates that the current macroblock is an area-last MB, the quantization parameter controlling unit 450 supplies the quantization parameter held at the top MB of the adjoining processing area to the quantization parameter calculating unit 112, so as to serve as the quantization parameter for the area-last MB. Although the present example illustrates the control which quantizes an area-last MB using the quantization parameter calculated at the area-top MB, the control which encodes an area-top MB and an area-last MB using the quantization parameter set up from the exterior is also possible.

According to the image encoding device 4 of FIG. 6, the decoding using the quantization parameter of the last MB of a parallel processing area becomes possible, when all the orthogonally-transformed coefficients of the top MB of a parallel processing area are zero. Even when all the orthogonally-transformed coefficients of the last MB of a parallel processing area are zero, it is possible to add a quantization parameter into a stream after variable-length encoding, and to generate the stream which can be correctly decoded. Since it is not necessary to form slices, the prediction is applied across a parallel processing area boundary, and encoding efficiency improves. Furthermore, since the quantization parameter in a picture can be unfixed, it is possible to realize a high-quality image by the rate control and the control of the quantization parameter depending on an image. Even when compared with FIG. 5, since all quantized orthogonally-transformed coefficients with a poor encoding efficiency remain to be zero, the encoding efficiency is high, and a satisfactory image quality can be obtained.

In the above, the invention accomplished by the present inventors has been specifically explained based on the embodiments. However, it cannot be overemphasized that the present invention is not restricted to the embodiments, and it can be changed variously in the range which does not deviate from the gist.

What is claimed is:

1. An image encoding device which encodes macroblocks of an encoding target image by parallel processing, sequentially from a top of a parallel processing area,
    the encoding target image arranged as slices based on H.264 protocol and divided into a plurality of parallel processing areas,
    the image encoding device comprising:
    a plurality of encoding elements provided for every said parallel processing area, and which generate variable-length codes; and
    a stream integration unit which integrates the variable-length codes which are output from the plurality of encoding elements in parallel,
    wherein the encoding element suppresses generation of a skip macroblock in a last macroblock of each parallel processing area, by encoding the last macroblock of a parallel processing area using the same quantization parameter as used in a top macroblock of a succeeding parallel processing area adjoining across a parallel processing area boundary, allowing generation of a skip macroblock in a top macroblock of each parallel processing area, and by adding a non-zero coefficient to a part of the quantized orthogonally-transformed coefficients by changing the part to non-zero when quantized orthogonally-transformed coefficients of the last macroblock of the parallel processing area are all zero.

2. An image encoding device which encodes macroblocks of an encoding target image by parallel processing, sequentially from a top of a parallel processing area, the image encoding device comprising:
    an encoding element provided for every parallel processing area; and
    a quantization parameter controlling unit,
    wherein the encoding element includes
    an orthogonal transformation unit operable to orthogonally transform an image difference value between data of an encoding target image and data of a reference image;
    a quantizer operable to quantize orthogonally-transformed coefficients orthogonally transformed by the orthogonal transformation unit and operable to output quantized orthogonally-transformed coefficients;
    a coefficient compensation unit operable to input the quantized orthogonally-transformed coefficients outputted by the quantizer, and when the quantized orthogonally-transformed coefficients of a last macroblock of each of the processing area are all zero, the coefficient compensation unit being operable to output the quantized orthogonally-transformed coefficients concerned partly replaced with a non-zero coefficient, and when the quantized orthogonally-transformed coefficients are not all zero, the coefficient compensation unit being operable to output the quantized orthogonally-transformed coefficients concerned without further modification;

an encoder operable to encode the quantized orthogonally-transformed coefficients and necessary encoding information outputted by the coefficient compensation unit; and a quantization parameter calculating unit operable to generate a quantization parameter to be supplied to the quantizer and the encoder, and wherein the quantization parameter controlling unit is configured to use the same quantization parameter to a top macroblock of each processing area and a last macroblock of an adjoining preceding processing area, in each said encoding element.

3. The image encoding device according to claim 2, wherein the quantization parameter controlling unit acquires and holds a quantization parameter of a top macroblock of every said parallel processing area, generated by the respective quantization parameter calculating unit in each encoding element, and wherein the quantization parameter controlling unit is configured to use, in processing the last macroblock of every processing area, the same quantization parameter as used in the top macroblock of a succeeding processing area adjoining to the macroblock concerned.

4. The image encoding device according to claim 2, wherein the non-zero coefficient replaced and outputted by the coefficient compensation unit is a one-valued coefficient.

5. An image encoding device which encodes macroblocks of an encoding target image by parallel processing, sequentially from a top of a parallel processing area, the image encoding device comprising:

an encoding element provided for every said parallel processing area, wherein the encoding element suppresses generation of a skip macroblock in a last macroblock of each said parallel processing area, by encoding the last macroblock of a parallel processing area using the same quantization parameter as used in a top macroblock of a succeeding parallel processing area adjoining across a parallel processing area boundary, allowing generation of a skip macroblock in a top macroblock of each parallel processing area, and generating encoding information including a coded block pattern denoting existence of a non-zero coefficient when the quantized orthogonally-transformed coefficients of the last macroblock of the parallel processing area are all zero.

6. An image encoding device which encodes macroblocks of an encoding target image by parallel processing, sequentially from a top of a parallel processing area, the image encoding device comprising:

an encoding element provided for every said parallel processing area; and a quantization parameter controlling unit, wherein the encoding element includes an orthogonal transformation unit operable to orthogonally transform an image difference value between data of an encoding target image and data of a reference image;

a quantizer operable to quantize orthogonally-transformed coefficients orthogonally transformed by the orthogonal transformation unit and operable to output quantized orthogonally-transformed coefficients;

an encoder operable to encode the quantized orthogonally-transformed coefficients and necessary encoding information outputted by a coefficient compensation unit; and a quantization parameter calculating unit operable to generate a quantization parameter to be supplied to the quantizer and the encoder, wherein the quantization parameter controlling unit controls the respective encoding element so as to use the same quantization parameter to a top macroblock of every said parallel processing area and to a last macroblock of an adjoining preceding parallel processing area, and wherein, when the quantized orthogonally-transformed coefficients of the last macroblock of the parallel processing area are all zero, the encoder generates a coded block pattern denoting existence of a non-zero coefficient, in exchange for a coded block pattern denoting that the quantized orthogonally-transformed coefficients are all zero.

7. The image encoding device according to claim 6, wherein the quantization parameter controlling unit acquires and holds a quantization parameter of a top macroblock of every said parallel processing area, generated by the respective quantization parameter calculating unit in each said encoding element, and wherein the quantization parameter controlling unit is configured to use, in processing a last macroblock of every parallel processing area, the same quantization parameter as used in a top macroblock of a succeeding parallel processing area adjoining to the macroblock concerned.

8. The image encoding device according to claim 6, wherein, when the quantized orthogonally-transformed coefficients of a top macroblock of every parallel processing area are all zero, encoding information generated by the encoder excludes a quantized orthogonally-transformed coefficient.

\* \* \* \* \*